United States Patent [19]

Nakatsuma

[11] Patent Number: 4,910,785
[45] Date of Patent: Mar. 20, 1990

[54] DISPLAY APPARATUS

[75] Inventor: Takuji Nakatsuma, Tokyo, Japan

[73] Assignee: Canon Kabushiki Kaisha, Tokyo, Japan

[21] Appl. No.: 281,898

[22] Filed: Dec. 6, 1988

Related U.S. Application Data

[63] Continuation of Ser. No. 914,064, Oct. 1, 1986, abandoned.

[30] Foreign Application Priority Data

Oct. 7, 1985 [JP] Japan .................................. 60-222926

[51] Int. Cl.$^4$ .............................................. G06K 9/00
[52] U.S. Cl. ........................................ 382/9; 340/701; 340/703; 340/706; 382/57
[58] Field of Search ...................... 382/9, 57; 340/701, 340/703, 706, 734

[56] References Cited

U.S. PATENT DOCUMENTS

| | | | |
|---|---|---|---|
| 3,903,517 | 9/1975 | Hafner | 382/57 |
| 3,911,418 | 10/1975 | Takeda | 340/703 |
| 4,149,145 | 4/1979 | Hartke et al. | 358/263 |
| 4,361,850 | 11/1982 | Nishimura | 340/701 |
| 4,394,649 | 7/1983 | Suchoff et al. | 340/706 |
| 4,437,093 | 3/1984 | Bradley | 340/703 |
| 4,639,721 | 1/1987 | Eto et al. | 340/703 |

FOREIGN PATENT DOCUMENTS 1175152  9/1984  Canada .

*Primary Examiner*—Leo H. Boudreau
*Attorney, Agent, or Firm*—Fitzpatrick, Cella, Harper & Scinto

[57] ABSTRACT

There is disclosed a display apparatus capable of displaying code data and image data. Both data are displayed in a different manner, for example in different colors, in order to enable the user to distinguish these data.

17 Claims, 2 Drawing Sheets

DISPLAY APPARATUS

This application is a continuation of application Ser. No. 914,064 filed Oct. 1, 1986, now abandoned.

BACKGROUND OF THE INVENTION

1. Field of the Invention

The present invention relates to a display apparatus employed for displaying image data.

2. Related Background Art

Image data employed in the business field are classified into code data generated in a character generator in response to character or symbol codes, and optical image data obtained by reading an image with an image sensor or by an image reading and a post-process applied thereto.

Some recent data editing apparatuses are designed to display both such character code data and image data. In such display, the operator is unable to identify whether the displayed data are character code data or image data, and thus may find difficulty in operation in case of further processing the displayed data.

SUMMARY OF THE INVENTION

An object of the present invention is to provide an improvement on the display apparatus.

Another object of the present invention is to eliminate the above-mentioned drawbacks in the conventional technology.

Still another object of the present invention is to display code data and optical image data in different manners.

Still other objects of the present invention will become fully apparent from the following description.

DETAILED DESCRIPTION OF THE PREFERRED EMBODIMENTS

Now the present invention will be clarified in detail by an embodiment thereof shown in the attached drawings.

Figure 1:
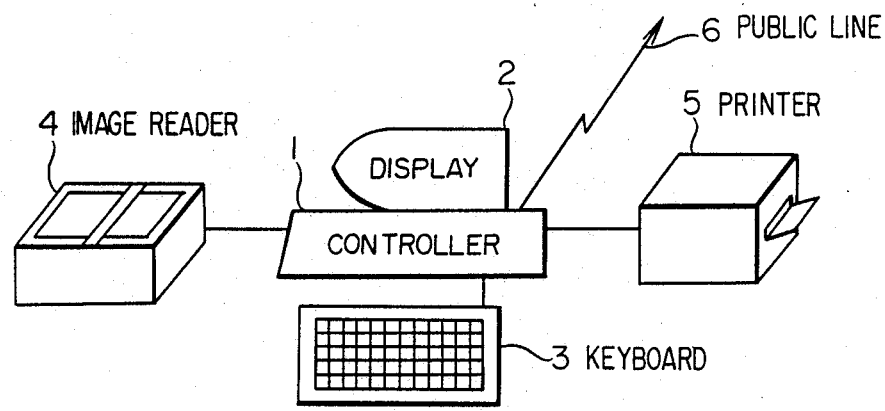
FIG. 1 is a schematic view of an embodiment of the present invention.

FIG. 1 illustrates the structure of said embodiment, wherein provided are a control unit 1, adapted for controlling an entire data communication terminal and composed of a microcomputer and peripheral devices such as a read-only memory (ROM) and a random access memory (RAM); a display apparatus 2 for displaying transmitted and received data, composed for example of a liquid crystal display unit, a cathode ray tube or the like; a key input unit 3 composed of a well known keyboard for entering code data such as character and symbols; an image reader unit 4, composed of an already known image reader employed generally in a facsimile apparatus, for entering optical image data; and a printer unit 5 for printing the receiving data.

In the following there will be schematically explained data transmitting and receiving operations in the above-explained structure.

First, a transmitting operation will be explained.

In case of transmitting an original document in which code data and optical image data are mixed, initially a portion to be transmitted as optical image data is entered by the image reading unit 4. The optical image data thus entered are displayed, by the control unit 1, on the display apparatus 2. Then the code data are entered by the keyboard 3, converted into dot data by a display character generator incorporated in the control unit 1, and displayed on the display apparatus, together with the optical image data entered in advance. Thus the operator prepares the data to be transmitted, while watching the display on the display apparatus 2. In this state, a transmission-reception file of the control unit 1 stores the code data in the form of codes and the optical image data in the form of an encoded image, and each data group has a leading portion containing an identification code, indicating whether said data are code data or optical image data, and address information. The optical image data are encoded for example by MH (Modified Huffman), MR (Modified Reed) or MMR (Modified Modified Reed) encoding method.

The transmission data, when completed, are read from the file of the control unit 1, then modulated if necessary in the control unit 1 and supplied to a public transmission channel 6.

At reception, the received data are demodulated in the control unit 1 if necessary and stored in the file therein. In displaying the received data on the display apparatus 2, the code image data are developed into dot data by a character generator for display use provided in said control unit 1, while the optical image data are decoded and displayed. In case of printout with the printer unit 5, the code data are developed into dot data by a character generator for printer use provided in the control unit 1, while the optical image data are decoded into data for printout. Then the converted data are supplied to the printer unit 5 and are printed out.

As before-mentioned, in case the code data and the optical image data are displayed on the display appartus 2, the code data and optical image data are stored in a display memory, both in the form of dot data, so that it is difficult for the operator to identify whether the displayed data are code data or optical image data.

In data display on the display apparatus 2, the present embodiment is capable of displaying the code data and optical image data in different manners, thereby facilitating the data processing of the operator, or separation of the areas of code data and optical image data into blocks, thus improving the operability.

Figure 2:
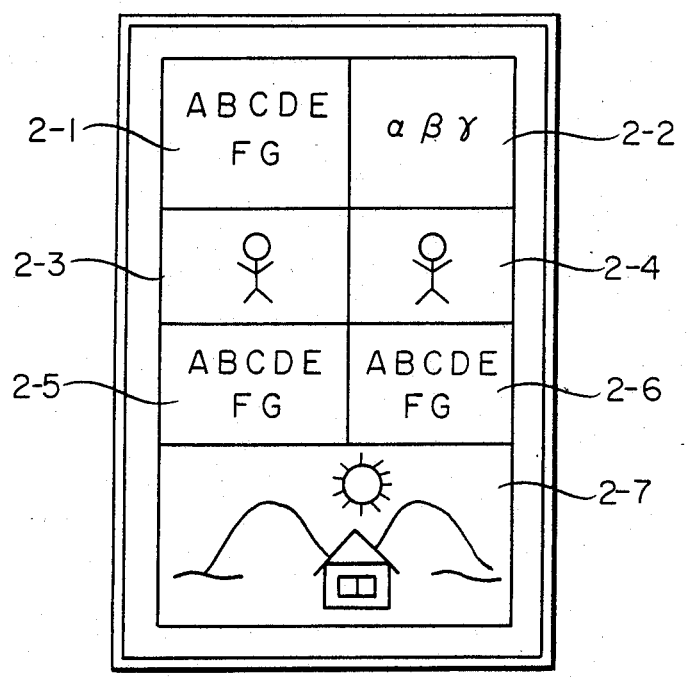
FIG. 2 is a plan view of an example of display obtained by a display apparatus 2 of said embodiment.

FIG. 2 shows an example of a display on the display apparatus 2 of the present embodiment, including code data blocks 2-1, 2-5, 2-6 and optical image data blocks 2-2, 2-3, 2-4, 2-7.

Figure 3:
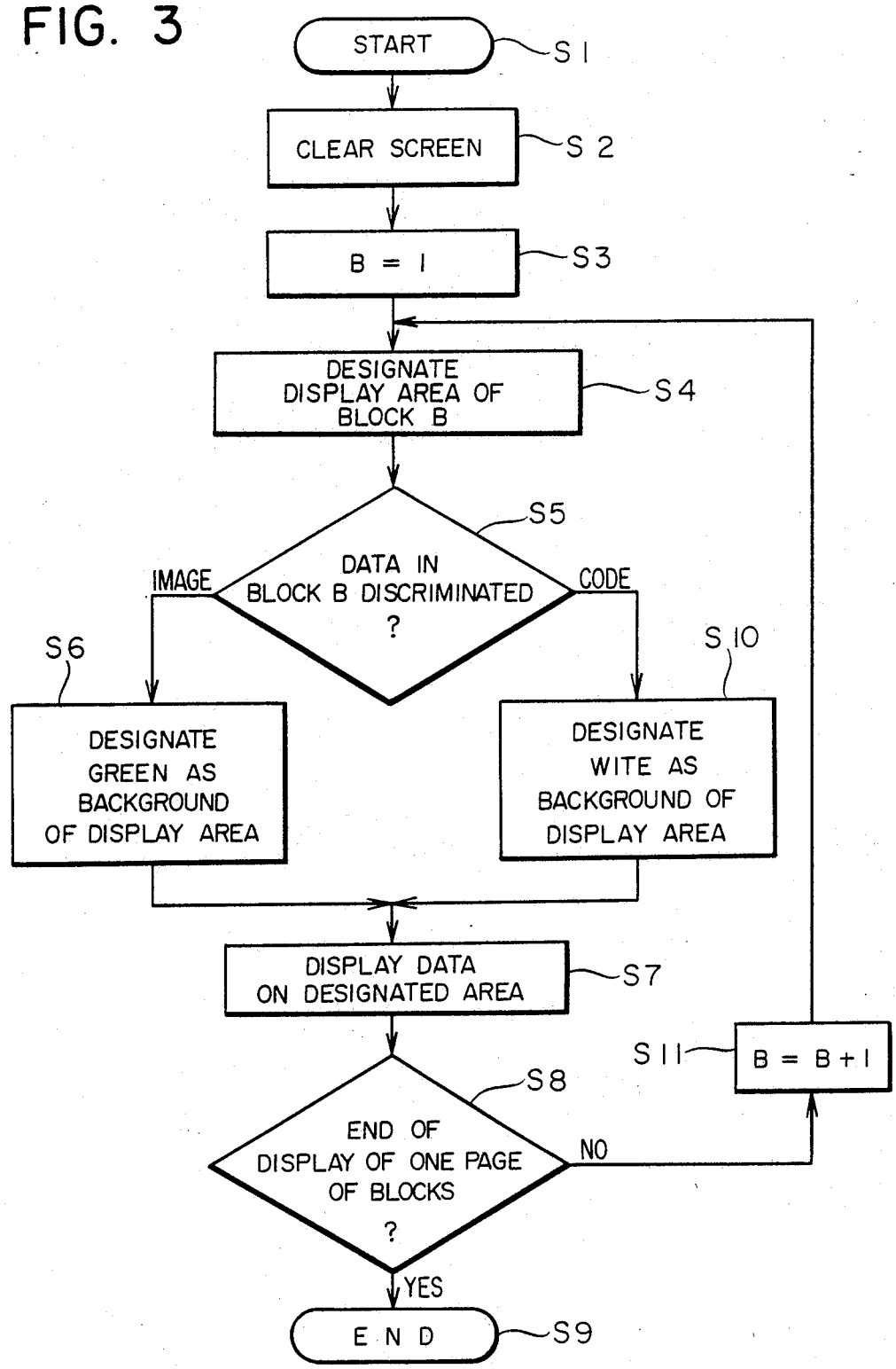
FIG. 3 is a flow chart showing the function of a control unit 1 of said embodiment.

FIG. 3 is a flow chart of the control sequence of the control unit 1 for the data display in the present embodiment.

At first a step S2 clears the display frame or screen, for one-page data, of the display apparatus 2.

Then a step S3 initializes a counter, incorporated in the control unit 1, for indicating the displayed block. A next step S4 designates a display area on the display apparatus 2, starting from the data of a first block. A next step S5 then discriminates whether the data of the first block are code data or optical image data. In case of optical image data, a step S6 designates green color for the background of the display area designated in the step S4. In case of code data, a step 10 designates a white background.

A step S7 displays the data of the first block on the designated area. Then a step S8 discriminates whether blocks of one page are all displayed, and, if there are still remaining blocks, a step S11 adds "1" to the block-indicating counter, whereupon the program returns to the step S4 and repeats the above-explained procedure.

Through these procedures the data as exemplified in FIG. 2 are divided into blocks and displayed with different background colors according to whether the displayed data are optical image data or code data.

In the foregoing explanation, the optical image data and the code data are distinguished by the difference in background color, and such distinction is possible when the display apparatus 2 has a color displaying function. However, depending on the characteristic of the display apparatus, said distinction may also be achieved by inverting black and white for the optical image data or the code data. In such case the steps S6 and S10 shown in FIG. 3 respectively designate white and black.

As explained in the foregoing, the display apparatus of the present invention displays code data and optical image data in different manners, in case of displaying data including these data in mixed manner. Thus the operator can select a suitable process for correcting or modifying such data, and improved operability can therefore be achieved.

The present invention is not limited to the foregoing embodiment but is subject to various modifications and applications.

Also, instead of changing the background color of the block as explained above, it is possible to adopt different character colors respectively for the image blocks and code blocks. Furthermore it is possible to display information indicating whether said block is a data block or an image block for each block.

What I claimed is:

1. A display apparatus comprising:
    a memory for storing data consisting of a mixture, on one page, of one or more areas consisting of code data such as characters or symbols, and one or more areas consisting of image data, the data being divided into respective blocks in accordance with the kinds of data;
    conversion means for reading the blocks of data stored in the memory and discriminating between the code data block and the image data block and converting the read blocks of data into dot data in response to the discrimination; and
    display means for displaying the converted dot data, wherein said display means displays the dot data converted from the code data block and the dot data converted from the image data block in a manner which distinguishes the dot data converted from the code data block from the dot data converted from the image data block without changing an original state of the mixture.

2. An apparatus according to claim 1, wherein the image data is compressed data and said conversion means expands the compressed data and then converts it into the dot data.

3. An apparatus according to claim 1, wherein said conversion means includes a character generator for converting each of the code data into corresponding font data.

4. An apparatus according to claim 1, wherein each of the blocks is provided with identification information indicating whether the block is a code data block or image data block.

5. An apparatus according to claim 1, further comprising means for communicating the data.

6. An apparatus according to claim 5, wherein said communication means transmits the data stored in the memory.

7. An apparatus according to claim 5, wherein data received by said communication means is stored in said memory.

8. An apparatus according to claim 1, further comprising means for editing the data stored in the memory.

9. A data communication apparatus comprising:
    code data input means for inputting code data such as characters and symbols;
    reader means for reading image data;
    editing means for editing the code data and the image data, and for forming a mixture of data comprising one or more area consisting of the code data and one or more areas consisting of the image data;
    communication means for communicating the mixture of data;
    memory means for storing the mixture of data edited by said editing means or the mixture of data received by said communication means;
    conversion means for reading, area by area, the mixture of data stored in said memory means and converting the read mixture of data into dot data; and
    display means for displaying the converted dot data, wherein said display means displays the dot data converted from the code data area and the dot data converted from the image data area in a manner which distinguishes the dot data converted from the code data area from the dot data converted from the image data area without changing an original state of the mixture.

10. An apparatus according to claim 9, wherein said display means separately displays the dot data converted from the code data and the dot data converted from the image data with respectively different background colors.

11. An apparatus according to claim 9, wherein the mixture of data stored in said memory means is divided into blocks in accordance with the kinds of data and each of the blocks is provided with identification information indicating the kind of data contained therein.

12. An apparatus according to claim 9, wherein said conversion means reads the mixture of data stord in said memory means block by block, discriminates whether data in each block is code data or image data, and converts each block data into the dot data in accordance with the discrimination.

13. An apparatus according to claim 9, wherein the image data is compressed data and said conversion means expands the compressed data and then converts it into the dot data.

14. An apparatus according to claim 9, wherein said conversion means includes a character generator for converting each of the code data into corresponding font data.

15. A display apparatus comprising:
    a source for generating data consisting of a mixture, on one page, of one or more areas consisting of code data, such as characters or symbols, and one or more areas consisting of image data;
    conversion means for converting the mixture of data into dot data area by area;
    display means for displaying the converted data; and
    control means for controlling said display means such that the dot data from the code data area and the dot data from the image data can be displayed in a manner which distinguishes the dot data from the code data area from the dot area from the image data area without changing an original state of the mixture.

16. An apparatus according to claim 15, wherein the code data area and the image data area are displayed with respectively different background colors.

17. An apparatus according to claim 15, wherein said source includes a memory for storing the data consisting of the mixture and reads the data stored in the memory.

* * * * *

UNITED STATES PATENT AND TRADEMARK OFFICE
CERTIFICATE OF CORRECTION

PATENT NO. : 4,910,785

DATED : March 20, 1990

INVENTOR(S) : Takuji Nakatsuma

It is certified that error appears in the above-identified patent and that said Letters Patent is hereby corrected as shown below:

Column 4, line 17, "erea" should read --areas--.

line 46, "stord" should read --stored--.

Column 5, line 4, "dot area" should read --dot data--.

Signed and Sealed this

Tenth Day of September, 1991

Attest:

HARRY F. MANBECK, JR.

Attesting Officer

Commissioner of Patents and Trademarks